July 30, 1929.　　J. H. HAMMOND, JR　　1,722,980
METHOD AND MEANS FOR SUSTAINING MUSICAL TONES
Original Filed Aug. 12, 1925　　5 Sheets-Sheet 1
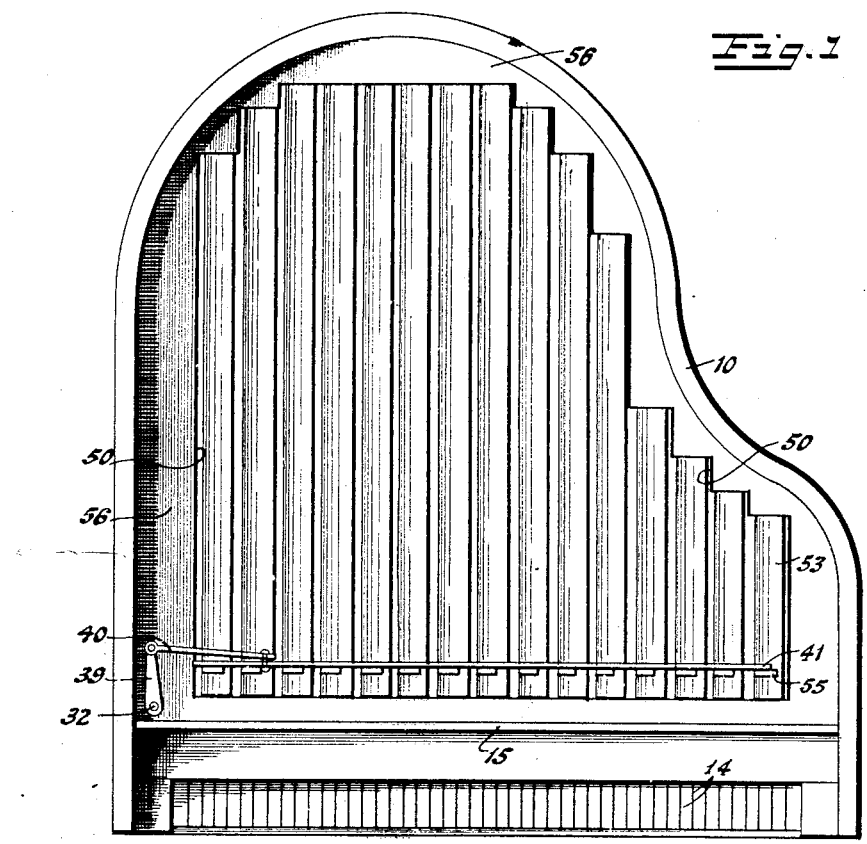
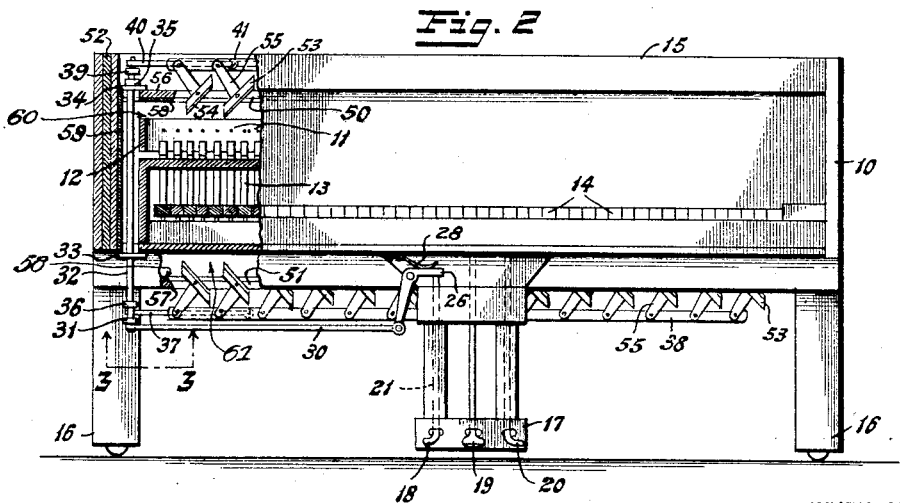
INVENTOR
John Hays Hammond, Jr.
ATTORNEY July 30, 1929.  J. H. HAMMOND, JR  1,722,980
METHOD AND MEANS FOR SUSTAINING MUSICAL TONES
Original Filed Aug. 12, 1925   5 Sheets-Sheet 2
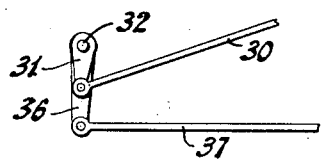
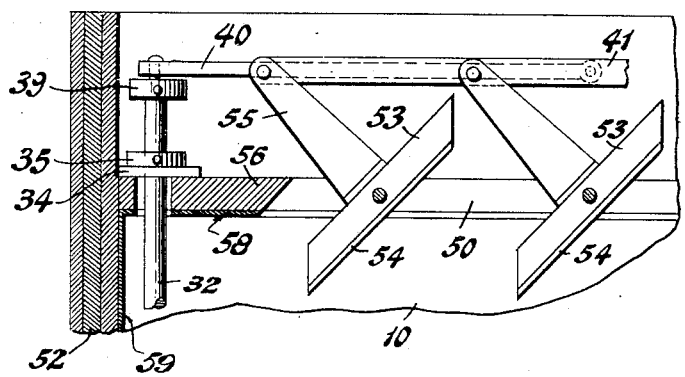
INVENTOR
John Hays Hammond, Jr.
BY G. A. E. Lundell
ATTORNEY Inventor
John Hays Hammond Jr.
by G. A. E. Lindell
his Atty.

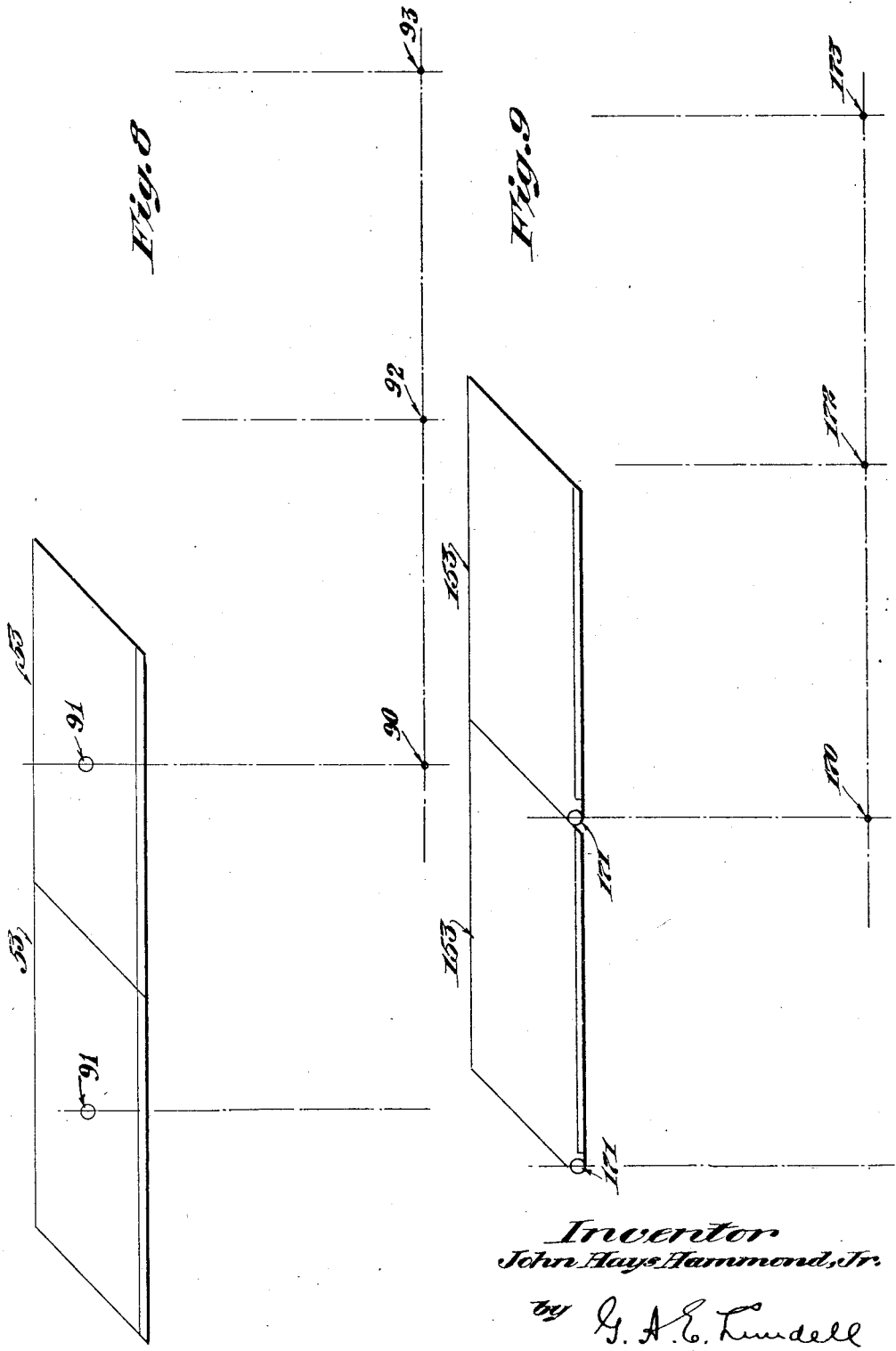

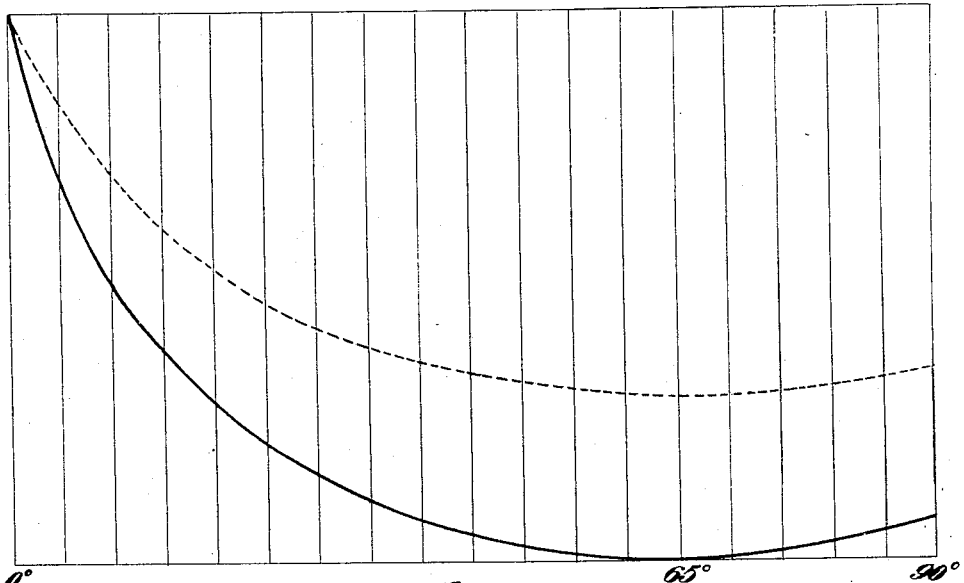
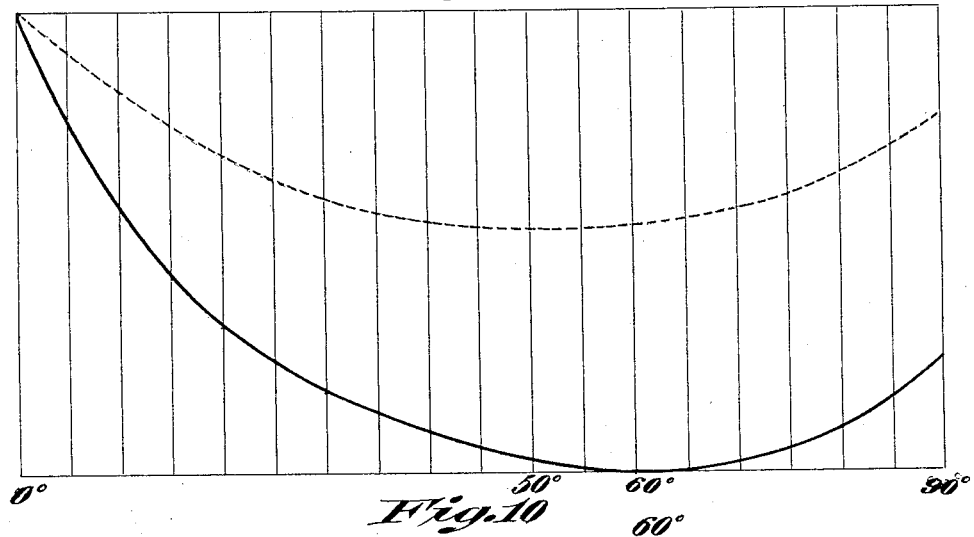
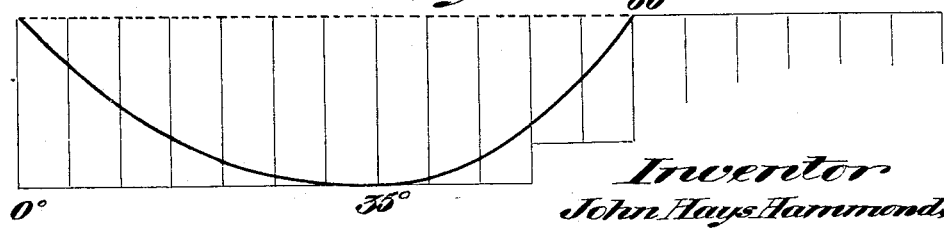

Patented July 30, 1929.

1,722,980

UNITED STATES PATENT OFFICE.

JOHN HAYS HAMMOND, JR., OF GLOUCESTER, MASSACHUSETTS.

METHOD AND MEANS FOR SUSTAINING MUSICAL TONES.

Application filed August 12, 1925, Serial No. 49,824. Renewed May 16, 1929.

This invention relates to musical instruments of the percussive type and especially to pianofortes and to means for improving the operation of such instruments.

The invention has reference to the improved control of the decrement of damped musical tones, and to imparting to the music, new and agreeable effects, and to improving the quality of tone produced by a particular instrument.

As an aid to the understanding of the present invention, the following characteristics of percussive musical instruments are cited. In any instrument of the percussive type for producing highly damped compressional waves having frequencies corresponding to the notes of the musical scale, the normal decrement of the waves of a given frequency are thought to depend at least in part upon such factors as the amount of energy imparted to the sound source, the characteristics of the sounding board or other resonant element, and of the casing forming the resonant chamber of the instrument. It is thought that these factors also aid in determining the timbre or musical quality of the tones produced. By varying the decrement of the damped waves the notes can be sustained for varying lengths of time in accordance with the effect it is desired to produce, and an important feature of the present invention is to control the decrement or damping of the notes to produce a desired effect.

Another object of the invention is to reduce the decrement and thus to sustain the notes for an increased period of time by what may be called for convenience of expression, regeneration. According to this feature a reflex action is employed for causing the energy of the sound waves to be again imparted to the sound source to reenergize it. When the source comprises tuned strings, as in a piano, the wave trains may be reflected in varying degrees, back to the source, and the strings and sounding board kept in vibration for considerable periods. The energy of the waves may thus be utilized efficiently, and many new and novel effects may be imparted to the music by varying the amount of energy reflected back relative to the amount emitted.

I have discovered that by sustaining the tones for a considerable period, and by confining the compressional waves within a resonant chamber, the intensity of sound increases and decreases periodically. This produces a beat effect which is a particularly novel and attractive effect with percussive instruments. It is thought that this beat effect is probably explained by a production of reflected waves which are alternately in phase and out of phase with the waves originally produced, thus alternately increasing and decreasing the intensity of sound.

I have also discovered that by providing centrally pivoted sound reflecting devices, improved control of sound reflection and regeneration is obtained, and thus there is effected a greatly increased delicacy of volume control and improved tone quality.

Another important feature of the present invention is to direct the sound waves produced by strings tuned to a particular note towards the strings tuned to the next higher harmonic of that note. Thus the energy of the waves is utilized to cause sympathetic vibration of the strings tuned to the upper harmonic and these strings in turn are caused to produce sound, the effect of which is to increase the brilliance of the instrument.

Other objects will appear from the following description taken in connection with the accompanying drawings, in which Figure 1 is a plan view of a grand piano embodying one form of the invention;

Figure 2 is a front elevation with parts broken away of the piano shown in Figure 1;

Figure 3 is a bottom plan view on the line 3—3 of Figure 2;

Figure 4 is an enlarged view of a portion of Figure 2;

Figure 8 shows diagrammatically a group of centrally pivoted reflectors in closed position;

Figure 9 shows a group of edgewise pivoted reflectors in fully closed position; and Figures 10, 11 and 12 show graphically variations in area of reflecting surface with the different strings of Figures 8 and 9, respectively.

Like reference characters refer to like parts in the several figures of the drawings.

Figure 5:
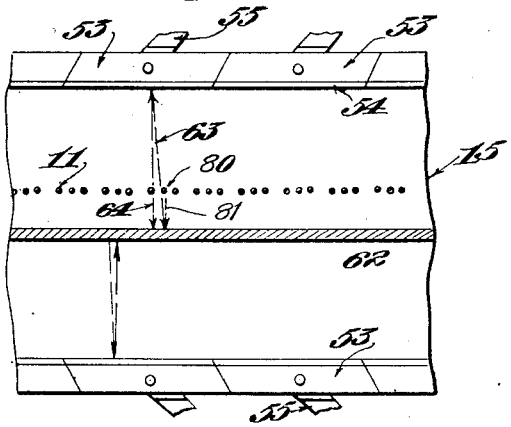
Figures 5, 6 and 7 are detailed sections of the reflectors shown in Figure 2, positioned in fully closed, partly opened and fully opened positions respectively.

In the following description and claims, parts will be identified by specific names for convenience of expression, but they are intended to be as generic in their application to similar parts or equivalent construction as the art will permit.

Referring to the drawings there is shown so much of a grand piano 10 as is necessary to an understanding of the present invention, and having applied thereto the features of the present invention. The embodiment illustrated comprises a grand piano 10 having for the purpose of producing sound a plurality of tuned strings such as 11 tuned to the notes of the musical scale. It will be understood that there may be provided for each note of the musical scale one or more of such strings as may be desired. For example in the lower part of the scale, a single string may be employed for each note; in the upper part of the scale, three strings may be employed for each note, and in an intermediate part of the scale two strings may be employed for each note. The strings 11 are mounted in a usual frame 12 in a conventional manner. For vibrating the strings of each of the notes of the scale by percussion there is provided a suitable hammer action such as 13 operatively connected to one of the keys 14 of the manual of the piano.

The strings are positioned within a casing 15 which is mounted upon a plurality of feet 16 so that the manual comprising the keys 14 is positioned at a convenient height above the floor. Below the manual and secured to the lower wall of the casing 15, there is provided a pedal block 17 upon which there is positioned a plurality of pedals, shown three in number, as at 18, 19, 20. The two right-hand pedals as seen in Figure 2, designated respectively 19 and 20 are connected to the sostenuto and loud pedal actions of the piano in a conventional manner, and having no bearing on the present invention, need not be further described.

The left-hand pedal 18 is pivotally mounted in the block 17 and is operatively connected to a vertically reciprocating rod 21 the upper end of which engages one arm of a pivoted bell crank lever 26. The arrangement is such that when the pedal 18 is depressed by the musician the rod 21 is raised and the bell crank lever 26 is rotated in a counter-clockwise direction as seen in Figure 2. A spring such as a leaf spring 28 is mounted on the casing of the piano and is arranged to act upon the bell crank lever 26 so as to maintain the bell crank lever and associated parts in the normal position illustrated in Figure 2. The opposite arm of the bell crank lever 26 is pivotally connected by means of a connecting rod 30 to a rotatable arm 31 affixed to the lower end of a rotatable shaft 32. The shaft 32 is journalled in spaced bearings 33, 34 mounted upon the casing 15 of the piano and extends through the casing to the upper portion of the piano. The shaft 32 is provided with a fixed collar 35 for maintaining the shaft in fixed longitudinal position with respect to its bearings. An arm 36 is affixed to the shaft below the lower wall of the casing 15 and is pivotally connected at its outer end to a link 37 extending to one end of a reciprocating connecting rod 38. Similarly there is secured to the shaft 32 near the upper wall of the casing 15 an arm 39, the outer end of which is pivotally connected by means of a connecting link 40 to a reciprocating connecting rod 41.

The casing 15 of the piano is provided with oppositely disposed controllable apertures as at 50, 51 (see Figure 2) and the boundary walls intermediate these apertures may be constructed to include a layer 52 of substantially sound insulating material. Mounted in the upper aperture 50 is a series of reflectors as at 53, therefor, serving to control the emission of sound. Each reflector 53 is preferably in the form of an elongated, flat member having beveled lateral edges and pivotally mounted to rotate about its longitudinal axis (see Figure 4). Each reflector is provided on its inner surface with a layer 54 of sound reflecting material which may be of sheet metal having a smooth surface, such as sheet aluminum, and on its outer face with an arm 55. The outer ends of the arms 55 of the upper series of reflectors are pivotally connected to the upper connecting rod 41.

In the lower aperture 51 of the casing there is mounted a second series of reflectors to control the emission of sound. The construction of the lower group of reflectors corresponds to that of the upper group and includes for each reflector a sound reflecting layer on the inner face which in this case is the upper face. The outer ends of the arms 55 of the reflectors of the lower group are pivotally connected to the lower connecting rod 38. Surrounding each of the apertures the casing includes an upper wall 56, and a lower wall 57 skirting the respective apertures, and having the edge beveled to conform to the edge of the contiguous reflector 53, and having on the inner face a layer of sound reflecting material 58.

The interior face of the intermediate boundary walls of the casing is also provided with a layer of similar sound reflecting material 59.

There are thus formed two resonating chambers, one designated by the reference character 60 extending between the upper series of reflectors and the sounding board, and a second resonating chamber designated 61 (see Fig. 2) extending between the sounding board and the lower series of reflectors.

In operating, the manual of the piano is employed by the musician in the usual way to cause vibration of the strings 11 in accordance with the music being played. In order to produce a desired effect let it be assumed that it is desired to sustain some of the notes of the music. Accordingly the pedal 18 is held down and thus the rod 21 is moved upwardly so as to rotate the bell crank lever 26 in a counter-clockwise direction as seen in Figure 2. The connecting link 30 and the connecting rods 41 and 38 are moved to the right and thus the reflectors 53 of the upper group of reflectors are rotated in a clockwise direction and the reflectors of the lower group are rotated in a counter-clockwise direction. Assuming that the pedal 18 has been fully depressed the reflectors are thus adjusted into the fully closed position with the respective apertures closed. The reflecting surfaces 54 of the reflectors, in combination with the reflecting surface 59 of the intermediate boundary walls of the casing 15 serve to reflect the energy of the compressional waves produced by the strings back to the strings and sounding board thus serving to impart the energy of the waves, by reflex or regenerating action again to the strings and sounding board. The vibration of the strings and sounding board is thus sustained for a considerable period. The effect of this is to produce a great improvement in the sonority of any pianoforte, sustaining chords and single notes in all registers of the scale to a remarkable degree. The sounding board in the usual type of pianoforte is but weakly affected, moreover, by the overtones, but I have found that where the impulses are successively repeated by reflection, the sounding board is more strongly vibrated and the pianoforte gains an unusual brilliancy with all the reflectors closed and in the horizontal position. It is understood that the usual piano action 13 includes damping action operable in a well known manner for preventing vibration of the strings, but that this damping action may be rendered ineffective automatically by depression of the respective key or by means of the so-called loud pedal 20 of the piano. With the shutters fully closed, the waves are emitted for example, from a string 80 (see Figure 5) and one series of waves emitted therefrom take the path indicated by the arrow 81 towards the sounding board 62 and are reflected therefrom in a path indicated by the arrow 63 into contact with the reflecting surface 54 of one of the reflectors 53, again being reflected into a path indicated by the arrow 64. This action may be sustained for a considerable time and it is clear that as the waves are reflected back and forth they will strike the strings and will tend to continue the vibration of the strings.

Figure 6:
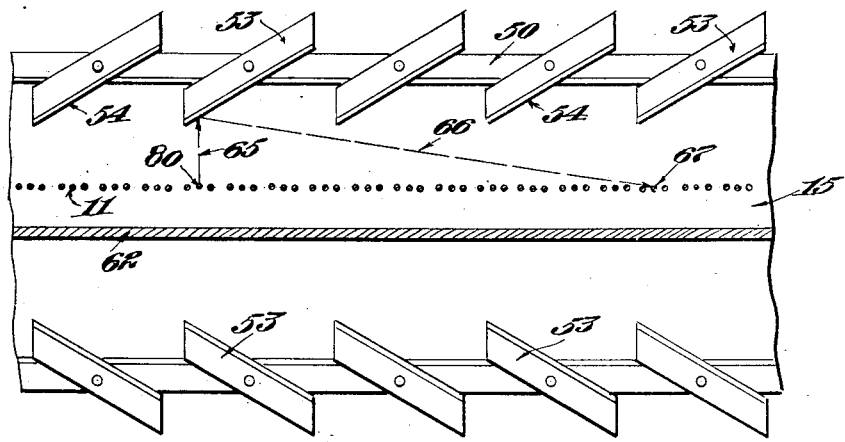

When it is desired to emit at least a portion of the sound produced within the casing 15 the pedal 18 is raised somewhat and this motion is communicated to the reflectors 53 causing them to be partially opened and to assume for example, a position such as indicated in Fig. 6. In this instance the compressional waves produced by the string 80 and taking for example a path shown by the arrow 65, will be reflected from the surface 54 of the closures 53 into a path represented by the arrow 66. By suitable adjustment of the controlling pedal 18 the waves can be caused to impinge upon the strings tuned to the first upper harmonic of the note to which the string 80 is tuned and represented as at 67 and thus the strings 67 will be vibrated in sympathy with the waves differing by one octave from its own period of vibration. This produces a marked increase in brilliance of the piano and improves the quality of tone.

Figure 7:
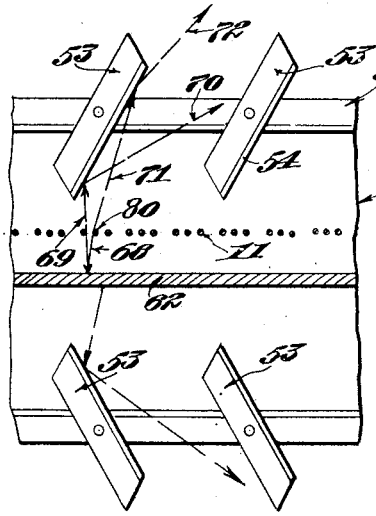

When it is desired to emit a still greater proportion of the sound, the pedal 18 is moved upwardly to a greater degree and the reflectors 53 take the position indicated diagrammatically in Fig. 7 where the waves from the string 80 may take the path indicated by the arrows 68, 69, 70 and also the path indicated for example by the arrows 71, 72, thus causing a marked increase in amplitude of tone, but increasing the decrement of vibration of the resonating elements within the case.

Referring to Figs. 8 and 9 there are shown two contrasting forms of reflecting devices, that shown in Fig. 8 being of the centrally pivoted type hereinbefore disclosed, and that shown in Fig. 9 being of the type hinged at the edge such as shown and described in my copending application Serial #77,518, filed December 24th, 1925. In each instance there has been indicated several of the tuned strings selected at random. One such tuned string designated 90 in Fig. 8 and 170 in Fig. 9 is shown in each of the figures as being substantially in alignment with the pivotal mounting of the reflecting device of Fig. 8 being shown as at 91 in Fig. 8. An edgewise pivoted closure 153 (see Fig. 9) is provided with a pivotal mounting as at 171 as described in the copending application referred to.

Referring to Fig. 10 there is graphically illustrated the variation in area of reflecting surface exposed to the direct action of sound emitted from the string 90, 170, the abscissa representing the angular displacement of the reflector 53, 153 from the fully closed position illustrated in the Figs. 8 and 9. The full line designates the variation in surface area exposed to the direct action of the string 90 in the case of the centrally pivoted reflector 53 and indicates a variation from maximum area at zero angle displacement from the position shown in Fig. 8 to minimum area at 35° displacement, reverting to maximum area 60° displacement, the maximum area continuing effective from 60° upwardly. Similarly the dotted line shown in Fig. 10 represents the variation in area exposed to the direct action of the string 170 in the case of edgewise pivoted reflector 153 of Fig. 9 and indicates that the maximum area is exposed to the direct action of sound waves emitted from the string 170 at all angular displacements. Thus it will be seen that the centrally pivoted reflector of Figure 8 provides for an increased control of effective sound reflecting surface and thus there is obtained a greatly increased delicacy of volume control.

Referring to Fig. 11 there is graphically illustrated the variation in area of reflecting surface exposed to the direct action of sound emitted from the string 92, 172, the abscissa representing the angular displacement of the reflector 53, 153 from the fully closed position illustrated in the Figs. 8 and 9. The full line designates the variation in surface area exposed to the direct action of the string 92 in the case of the centrally pivoted reflector 53 and indicates a variation from maximum area at zero angle displacement from the position shown in Fig. 8 to minimum area at 60° displacement, increasing until the reflector is at 90° displacement. The minimum reflecting area of the centrally pivoted reflector is less than the minimum reflecting area of the edgewise pivoted reflector. Thus it will be seen that the centrally pivoted reflector of Figure 8 provides for an increased control of effective sound reflecting surface with respect to the strings 92 and 172.

Referring to Figure 12 there is graphically illustrated the variation in area of reflecting surface exposed to the direct action of sound emitted from the string 93, 173 of Figures 8 and 9, the abscissa representing the angular displacement of the reflector 53, 153 from the fully closed position illustrated in the Figures 8 and 9. The full line designates the variation in surface area exposed to the direct action of the spring 93 in the case of the centrally pivoted reflector 53 and indicates a variation from maximum area at zero angle displacement from the position shown in Figure 8 to minimum area at 65° displacement, increasing until the reflector is at 90° displacement. Similarly the dotted line shown in Figure 12 represents the variation in area exposed to the direct action of the string 173 in the case of edgewise pivoted reflector 153 of Figure 9 and indicates that the maximum area is exposed to the direct action of sound waves emitted from the string 173, and decreasing to minimum area at 65° displacement, and again increasing until the reflector is at 90° displacement. The minimum reflecting area of the centrally pivoted reflector is much less than the minimum reflecting area of the edgewise pivoted reflector. Thus it will be seen that the centrally pivoted reflector of Figure 8 provides for an increased control of effective sound reflecting surface with respect to the strings 93 and 173.

The invention upon which this application is based is broader than the specific embodiment shown and described for the purpose of illustrating at least one of the ways in which it may be employed. The scope of the invention is therefore to be understood as not being limited by the present specific description. I intend no limitations other than those imposed by the claims.

What I claim is:

1. An instrument for producing damped compressional waves, comprising a vibratory element, a casing therefor, having controllable apertures, and a plurality of sound reflectors rotatably positioned in said apertures for directing waves produced by said element in a desired direction.

2. In a musical instrument, the combination with a source of sound, of a casing surrounding said source and having an interior reflecting surface to reflect sound, and means for varying the amount of sound reflected back to the source from said surface independently of the total volume of sound produced.

3. In a musical instrument, the combination with a source of sound, of a casing surrounding said source, said casing having an aperture for emitting sound, a closure for said aperture, the interior surface of said casing and said closure having a layer of sound reflecting material, and means for variably positioning said closure to reflect desired proportions of sound back into said casing.

4. In a musical instrument, a plurality of tuned strings, a sounding board adjacent strings, a casing surrounding said strings and board, a group of movable reflectors positioned adjacent the strings for reflecting sound waves in desired directions, a second group of movable reflectors positioned adjacent the sounding board for reflecting sound waves in desired directions, and a single pedal operatively connected to said reflectors for controlling all of said reflectors.

5. In a musical instrument, means for producing damped compressional waves, a casing surrounding said means, said casing having apertures for emitting the waves, a plurality of closures for said apertures each having a compressional wave reflecting surface on its inner surface, and means for controlling said closures to reflect at least a portion of the energy of said waves back to the wave producing means.

6. In a musical instrument, means for producing damped compressional waves, a casing surrounding said means, said casing having a compressional wave reflecting inner surface and provided with apertures, a plurality of closures for said apertures each closure having a compressional wave reflecting surface on its inner surface, and means for rotating said closures into fully closed position to form a wave sustaining chamber within said casing.

7. In a musical instrument, the combination with a source of sound, of a casing surrounding said source and having an interior reflecting surface to reflect sound, a sound outlet for said casing, and means for reflecting at least some of the sound emitted from the outlet back to the source of sound for reenergizing said source.

8. The method of producing music which consists in vibrating a string tuned to a fundamental note, directing some of the energy of the waves emitted from said string into contact with a second string tuned to an upper harmonic of the funadmental, and varying the intensity of energy so directed.

9. The method of producing music which consists in the step of producing a fundamental tone by percussion, directing compressional waves corresponding thereto into contact with a string tuned to an upper harmonic of said note, and varying the energy of said directed waves.

10. The method of producing music which consists in vibrating a string tuned to a fundamental note, reflecting waves emitted from said string into contact with a second string tuned to an upper harmonic of the fundamental, and modifying the intensity of the reflected waves independently of the action of the string.

11. The method of producing music which consists in the step of producing a fundamental tone by percussion, reflecting compressional waves corresponding thereto into contact with a string tuned to an upper harmonic of said note, and modifying the direction of reflection of said waves.

12. In an instrument for producing music, a source of sound, a substantially sound-proof casing surrounding said sound source and having apertures therein, a plurality of centrally pivoted metal lined reflectors positioned in said apertures, and means to vary the area of effective sound reflecting surface.

13. In a musical instrument, the combination with a piano, of a plurality of centrally pivoted metal lined reflectors for variably controlling sound, and means for varying at will the relative amount of sound reflecting surface.

14. In a musical instrument, a plurality of strings for producing sound, a sounding board adjacent said strings, a substantially sound-proof casing surrounding said strings and said board and including a plurality of metal lined sound reflectors, arranged in groups, each of said sound reflectors being pivotally mounted upon substantially its longitudinal axis, said sounding board serving as a partition to divide the casing into two insulated resonating chambers, and means for varying the relative amount of surface of said reflectors effective for reflecting sound.

15. An instrument for producing damped compressional waves, comprising a plurality of tuned strings, means for striking the strings tuned to a note of the musical scale, a sounding board adjacent said strings, a casing for the instrument having apertures, reflecting devices positioned in the apertures, and means for varying the position of said devices with respect to the strings to vary the amount of surface directly acted upon by sound from the strings.

16. An instrument for producing damped compressional waves, comprising a plurality of tuned strings, means for striking the strings tuned to a note of the musical scale, a sounding board adjacent said strings, a casing for the instrument having apertures, reflecting devices positioned in the apertures, each of said devices comprising a centrally pivoted flat member having a metal lining on its interior face, and means for varying the position of said devices with respect to the strings to vary the amount of surface directly acted upon by sound from the strings.

17. An instrument for producing damped compressional waves, comprising a plurality of tuned strings, means for striking the strings tuned to a note of the musical scale, a sounding board adjacent said strings, a metal lined casing for the instrument having apertures, reflecting devices positioned in the apertures, each of said devices comprising a centrally pivoted flat member having a metal lining on its interior face, and means for varying the position of said devices with respect to the strings to vary the amount of surface directly acted upon by sound from the strings.

18. An instrument for producing damped compressional waves comprising a vibratory element, a metal lined casing therefor, having apertures, a plurality of centrally pivoted metal lined sound reflectors positioned in said apertures, and means for rotating said reflectors to vary the amount of sound reflecting surface made effective.

19. In a musical instrument of the percussive type, the combination with tuned vibratory elements, of a substantially sound proof casing enclosing said elements and having opposed apertures for emitting sound, said casing including metal lined walls intermediate its apertures, and centrally pivoted metal lined reflectors mounted in said apertures and arranged to form in one position closures for said apertures and in other position to modulate the sound by reflection.

20. In a percussion instrument comprising a plurality of strings tuned to different notes, a casing therefor having a sound reflecting lining, movable closures for said casing, and means whereby sound waves from a given string may be variably reflected by said closure to a differently tuned string.

21. In a percussion instrument comprising a plurality of strings tuned to different notes, a casing therefor having a sound reflecting lining, movable closures for said casing, and means for reflecting sound waves by said variable closure from a given string to a string tuned to a harmonic thereof.

22. In an instrument for producing damped compressional waves having a vibratory element and a sounding board, a metal casing surrounding said sounding board and having two opposite sides whose angularity with respect to the sounding board may be varied at will.

Signed at Gloucester, in the county of Essex and State of Massachusetts, this 11th day of August, A. D. 1925.

JOHN HAYS HAMMOND, Jr.